United States Patent [19]

Zipperle

[11] Patent Number: 4,948,240
[45] Date of Patent: Aug. 14, 1990

[54] SUN VISOR FOR MOTOR VEHICLES

[76] Inventor: Michael Zipperle, Mühlstr. 8, D-7140 Ludwigsburg, Fed. Rep. of Germany

[21] Appl. No.: 225,254

[22] Filed: Jul. 28, 1988

[30] Foreign Application Priority Data

Mar. 9, 1988 [EP] European Pat. Off. ............ 88103694

[51] Int. Cl.⁵ ........................... G02B 27/00; B60J 3/00
[52] U.S. Cl. ..................................... 350/606; 350/631; 296/97.1; 296/97.5
[58] Field of Search ............... 350/606, 608, 631, 632; 296/97.1–97.11, 152

[56] References Cited

U.S. PATENT DOCUMENTS

| | | | |
|---|---|---|---|
| 2,299,775 | 10/1942 | Westrope | 296/97.11 |
| 4,149,749 | 4/1979 | Canal | 296/97.1 |
| 4,564,234 | 1/1986 | Kaiser et al. | 296/97.5 |
| 4,648,011 | 3/1987 | Boote et al. | 296/97.5 |
| 4,821,374 | 4/1989 | Gavagan | 296/97.9 |

Primary Examiner—Bruce Y. Arnold
Assistant Examiner—Thong Nguyen
Attorney, Agent, or Firm—Wigman & Cohen

[57] ABSTRACT

In a sun visor for motor vehicles comprising a mirror and a slider made of a plastic material which serves to cover the mirror and which is guided in guide rails of a holder consisting of a plastic material, there is formed at at least one of the two edge zones of the slider at least one elastic tongue which rests in a biased state against the guide rail accommodating this edge zone and which forms an elastic detent projection which at least in the one end position of the slider cooperates in a frictionally connected manner with a detent provided on the guide rail. A shaped spring inserted in a longitudinal slot of the slider in the edge surface thereof resulting from its thickness may be provided instead of the tongue.

24 Claims, 4 Drawing Sheets

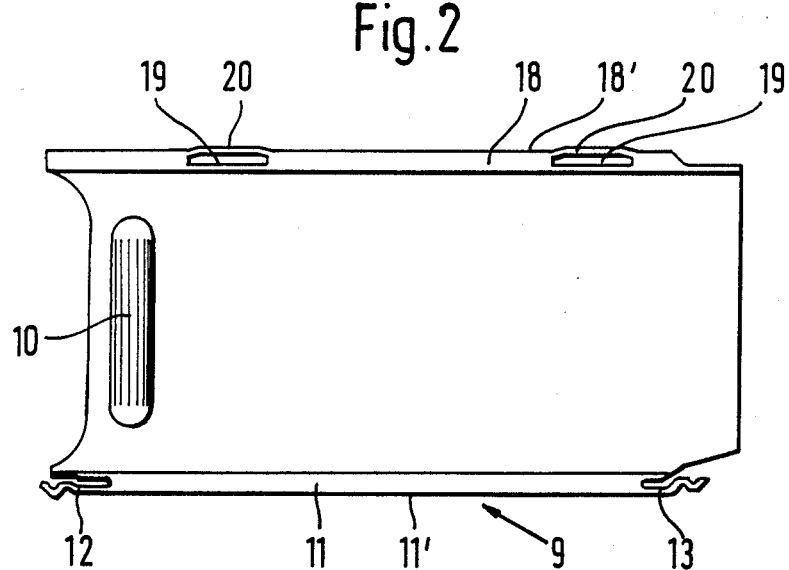
Fig. 2
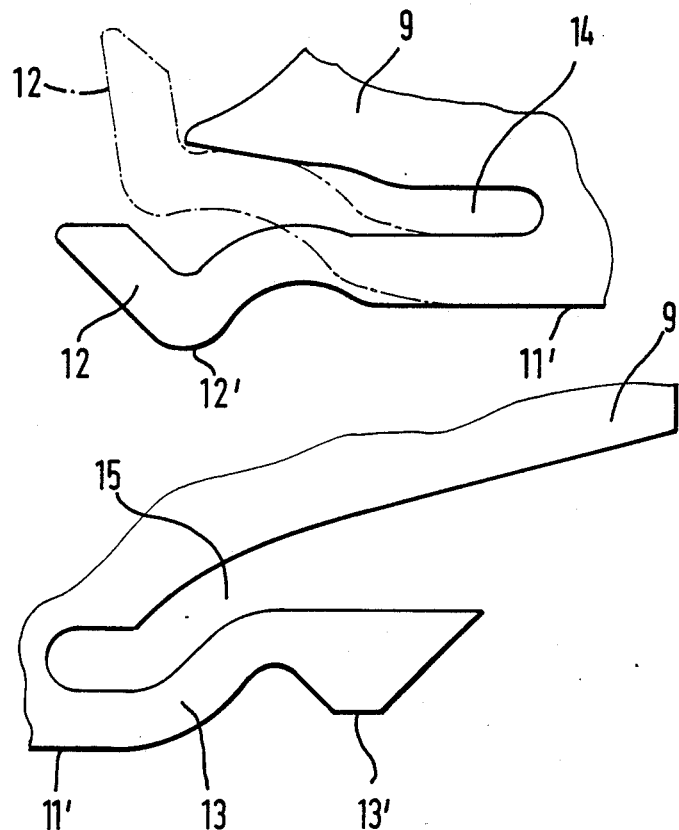
Fig. 3
Fig. 4

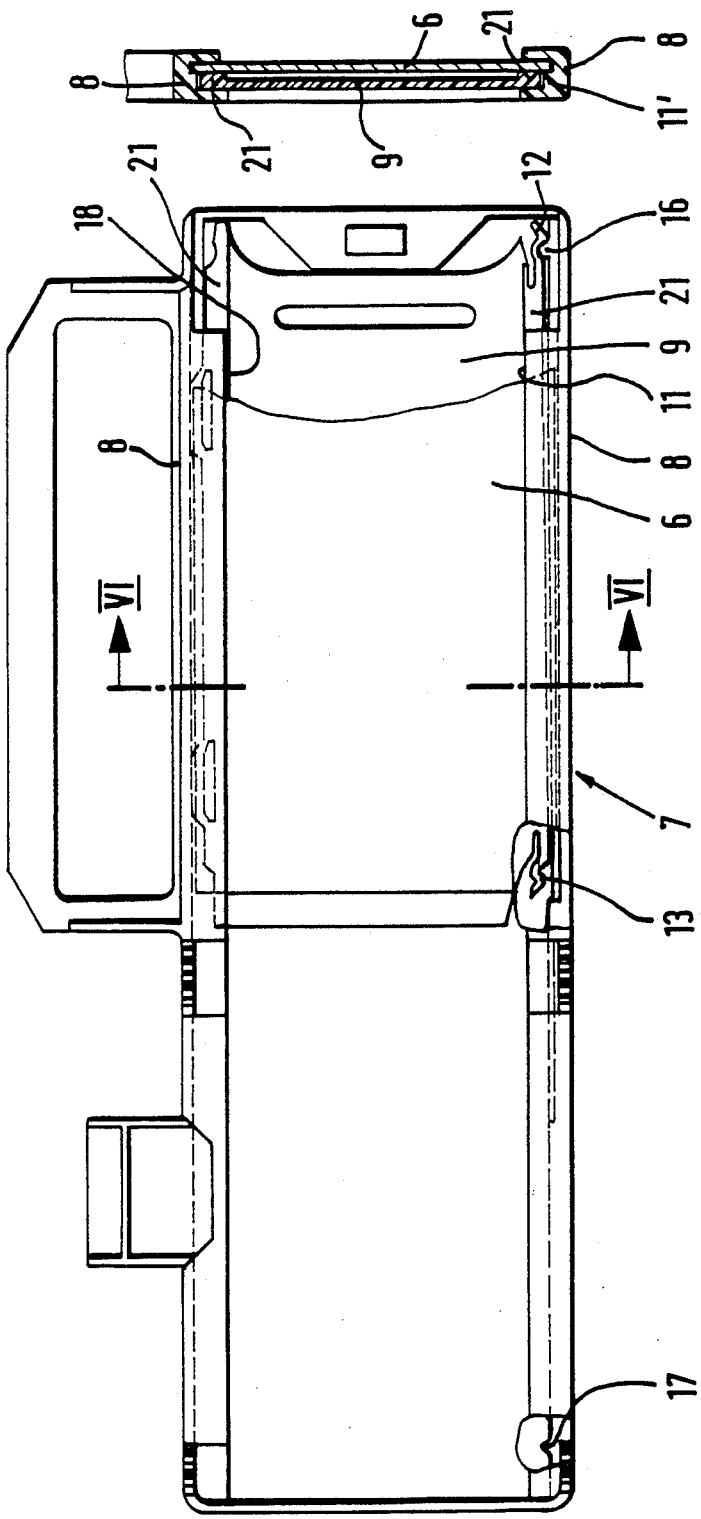

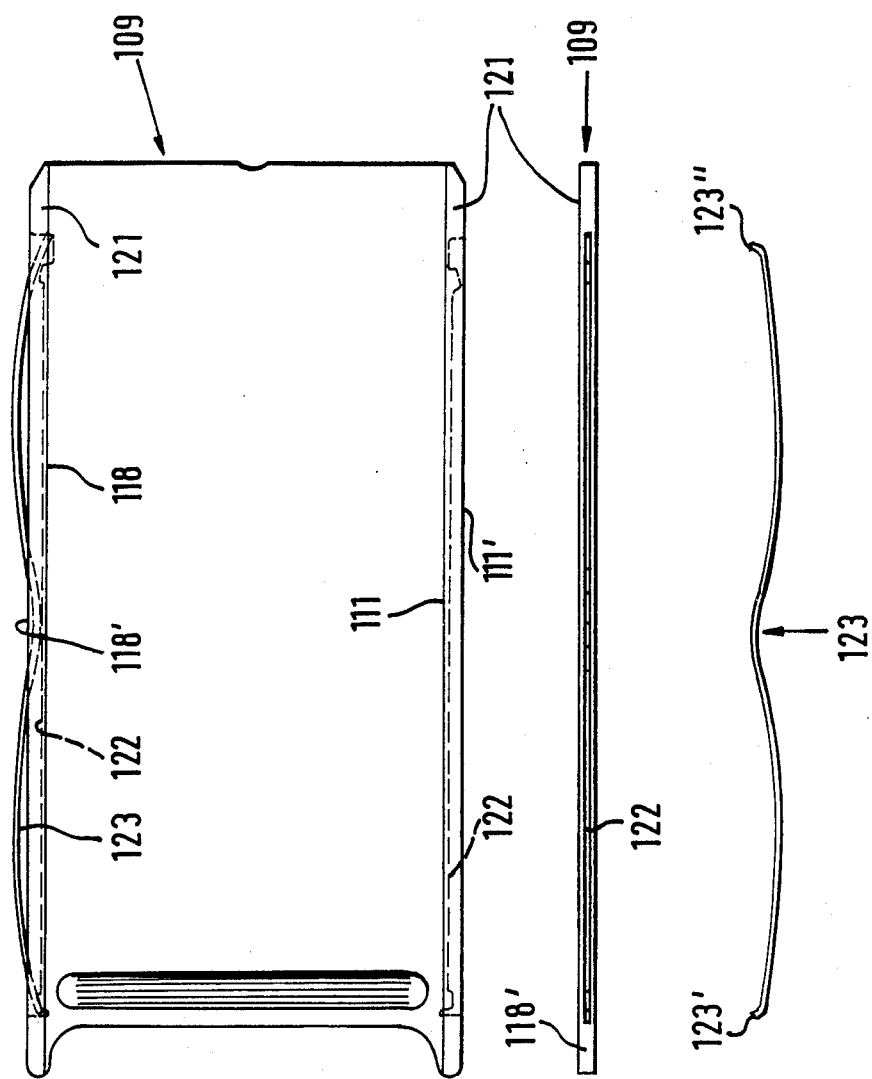

SUN VISOR FOR MOTOR VEHICLES

BACKGROUND OF THE INVENTION

The invention relates to a sun visor for motor vehicles and more particularly to such a sun visor having a mirror and a slider made of a plastic material which serves to cover the mirror and which is guided in the region of its two edge zones extending in the direction of displacement in one guide rail each of a holder made of a plastic material.

In the known sun visors of this kind, use of plastic as material for the slider and the holder contributes towards achieving favorable manufacturing costs and low weight. However, on account of the very large temperature variations to which a sun visor is subjected, the thermal expansions and shrinkages of the slider and the holder forming the guide rails affect the known sun visors to such an extent that the force required to move the slider varies considerably although narrow tolerances are maintained. Even if the dimensions are determined or chosen so that the prescribed force for actuating the slider is reached in the middle of the temperature range, in the two end zones the slider may move of its own accord as a result of jolts or the required actuating force may be much too high.

SUMMARY AND OBJECTS OF THE INVENTION

In view of the foregoing limitations and shortcomings of the prior art devices, as well as other disadvantages not specifically mentioned above, it is a primary objective of the invention to provide a sun visor of the kind described at the beginning in which, with a low level of expenditure, a substantially constant force for displacement of the slider is guaranteed throughout the entire temperature range.

Briefly described, a primary and other objects of the invention are accomplished according to the invention by providing a sun visor for a motor vehicle having a mirror, a plastic slider adapted for displacement for covering and uncovering the mirror, a plastic holder for the mirror and slider, and means provided on the slider for frictional engagement with the holder whereby the slider is retained on the holder.

In a first embodiment of the invention, the frictional force which must be overcome in order to displace the slider is applied with the aid of at least one elastic tongue formed on the slider. Due to the extent of its spring deflection which is large in comparison with the thermal expansions which occur, the elastic tongue is capable of maintaining the frictional force substantially constant throughout the entire temperature range. In addition, this frictional force can be kept very low because the tongue cooperates in a frictionally connected manner in at least one end position of the slider with a detent provided on the guide rail and thereby reliably prevents the slider from moving unintentionally out of its end position even when subjected to very strong jolts or other external force effects. It is, of course, also possible for the elastic tongue to be provided on one of the rails and for the detent to be formed on the slider.

In a second embodiment of the invention, a shaped spring is used to provide the frictional engagement. The spring deflection of the shaped spring determining the frictional force is likewise of such size, in comparison with the thermal expansions which occur, that the frictional force remains substantially constant throughout the entire temperature range because the spring deflection, which determines the frictional force, remains substantially constant. If one dispenses with detention of the slider in one or both end positions with the aid of this shaped spring, then, for example, a slight wave shape, i.e., a very simple shape is adequate for the shaped spring. This also renders this solution a very favorably priced one. However, even if the shaped spring is designed as detent element, the additional expenditure is only minimal.

With a design in accordance with the first embodiment the elastic tongue may be provided with a slot separating the tongue from the material part of the slide. The width of this slot at the level of the end section of the elastic tongue resting against the guide rail is selected so as to be approximately equal to the deflection of the elastic tongue by a material part of a detent projecting toward the slider. By this feature of the invention extremely simple means can be used to achieve a high detaining force even with a very low frictional force and yet the tongue is not subjected to too high stress.

In order for the slider to be detainable in both end positions, the guide rail may be provided with a detent for each of both end positions and either the elastic tongue made to cooperate with these two detents or a second elastic tongue may be provided on the slider for the second end position. The last above-mentioned possibility has the advantage that both detents can lie outside of the slideway which the guide rail forms for the slider.

The second tongue could also be used to generate a frictional force. However, since the necessary frictional force can usually be generated by one single tongue, in a preferred embodiment, the second elastic tongue is designed so as not to rest against the guide rail in its relaxed state and to only be deflected when it cooperates with the associated detent.

If required, the slider may have at least one elastic element formed by a slot or slots in the edge zone located opposite the tongue or tongues.

A particularly simple and economical construction is obtained with a guide rail design having a U-shaped cross-section. In this case, it is advantageous to provide strip-like elevations on the side of the slider that rests against the mirror.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 2 is an enlarged view of the slider of the first embodiment;

FIGS. 3 and 4 are enlarged sections taken from FIG. 2;

FIG. 5 is a plan view of the rear side of the holder of the first embodiment accommodating the mirror and the slider, with portions of the mirror broken away to illustrate the slider;

FIG. 6 is a section taken on line VI—VI in FIG. 5;

FIG. 7 is a view of the front side of the slider of the second embodiment;

FIG. 8 is a plan view of the slider of FIG. 7; and
FIG. 9 is a view of the spring of the slider of the second embodiment.

DETAILED DESCRIPTION OF THE PREFERRED EMBODIMENTS

Figure 1:
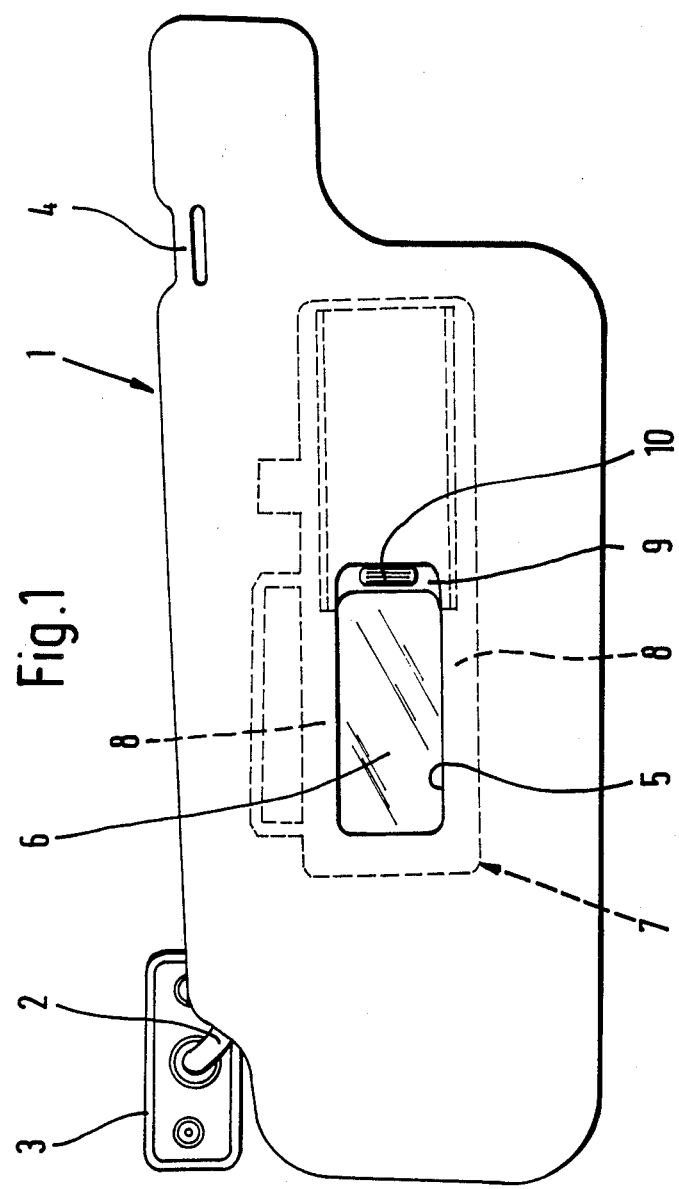
FIG. 1 is a view of the first embodiment.

A sun visor for a motor vehicle has a padded visor body 1 which can be swivelled about a swivel axis 2, only one end section of which protrudes from visor body 1. This end section is connected to an attachment plate 3 by a ball-and-socket joint. The padding holder, not illustrated, of visor body 1 forms in an extension of swivel axis 2 an axis section 4 which is normally clipped into a bearing secured to the motor vehicle body, but can be removed from it when the visor body 1 is to be swivelled towards the side window.

In the side facing the vehicle occupants when the sun visor is in the used position, visor body 1 has a recess 5 which extends around a mirror 6 which is fixed in a holder 7 which is arranged in the interior of visor body 1 and is connected to its padding holder. Holder 7 which consists of a plastic material and is of integral configuration forms two guide rails 8 which are of U-shaped cross-section and extend parallel to swivel axis 2. These not only accommodate the upper and lower edges of mirror 6 but also serve to guide a slider 9 which consists of a plastic material and is similarly of integral configuration. The mirror 6 can be selectively uncovered or covered by slider 9. To effect the displacement required for this, the slider has a gripping portion 10 of toroidal configuration on the side facing away from mirror 6.

As shown in FIG. 2, there are formed at the two ends of one of the two edge zones extending in the direction of displacement a first and a second elastic tongue 12 and 13, respectively, which extend in the longitudinal direction of this edge zone 11 but point in opposite directions. Both elastic tongues 12 and 13 which are each separated from the adjacent material part of slider 9 by a slot 14 and 15, respectively, on the side facing away from this slot. As shown, in particular, in FIGS. 3 and 4, detent projection 12' protrudes beyond the narrow longitudinal side 11' forming a sliding surface of the edge zone 11 when tongue 12 is in the relaxed state, whereas detent projection 13' does not extend as far as into the sliding surface of slider 9 defined by the narrow longitudinal side 11'. Hence, only the first elastic tongue 12 influences the frictional force effective between slider 9 and guide rails 8 which is so selected that the adjusting force to be applied to slider 9 is approximately 10 N. Owing to the relatively large extent of spring deflection made available to the first elastic tongue 12 by slot 14, and to the relatively soft spring characteristic, the actuating force required to displace slider 9 does not change noticeably throughout the entire temperature range of between approximately minus 30 degrees and plus 80 degrees Celsius although the thermal expansion of slider 9 and holder 7 is considerable within this large temperature range.

The first elastic tongue 12 forms together with a detent elevation 16 formed on guide rail 8 accommodating edge zone 11 a detent device which holds slider 9 with a sufficiently high detaining force in the position in which mirror 6 is completely covered. In order to attain the necessary detaining force in spite of the low spring force of the first elastic tongue 12, as shown, in particular, in FIG. 3, the slot 14 is of such design that the elastic tongue 12 is supported at slider 9 when detent projection 12' is moved over detent elevation 16.

Associated with the second elastic tongue 13 is a second detent elevation 17 which is formed on the same guide rail 8 which is provided with detent elevation 16, but in the region of its other end section in order for the second elastic tongue 13 and the second detent elevation to engage in a frictionally connected manner when slider 9 uncovers the mirror fully.

In the embodiment, the other edge zone 18 opposite edge zone 11 is provided with two slots 19 which extend in its longitudinal direction and are arranged in spaced relation to each other. The two material parts 20 which delimit the slots outwardly are elastically deformable into slots 19 and, in the non-deformed state, project somewhat beyond the narrow longitudinal side 18' of edge zone 18. Hence, the material parts 20 form two elastically yielding slide elements by means of which thermal expansions are compensated for even better than with the first elastic tongue 12 alone.

As shown, in particular, in FIG. 6, mirror 6 and slider 9 lie alongside each other in the two guide rails 8. The inside contour of the two guide rails 8 is adapted to the differently sized widths of mirror 6 and slider 9, as is also shown in FIG. 6. On the side facing mirror 6, the two edge zones 11 and 18 of slider 9 form one projecting strip 21 each, the spacing of these projecting strips from one another being greater than the height of recess 5. The slider 9 rests with strips 21 on the front side of mirror 6, whereby the friction between mirror 6 and slider 9 is kept at a very low level.

The second embodiment differs from the first embodiment described above only by a modified design of its slider 109, illustrated in FIGS. 7 through 9. Accordingly, the second embodiment will only be described insofar as it differs from the first embodiment.

The two edge zones 111 and 118 of slider 109 are each provided in the region widened by the projecting strips 121 with a longitudinal slot 122 which is open towards the associated narrow longitudinal side 111' and 118', respectively. It would, however, be sufficient for only one of the two edge zones to be designed in this way. The longitudinal slots 122 end at a relatively short distance from the two ends of the edge zone containing them. As shown in FIG. 7, the longitudinal slots 122 have recesses at both ends. The dimension (or length) of the one recess in the direction of displacement of slider 109 is adapted to the dimension (or thickness) of an angled end section 123' of a shaped spring 123 made from a steel wire, in order to accommodate this end section 123' in an immovable manner in the direction of motion of slider 109. As shown in FIGS. 7 and 9, the shaped spring 123 forms two arcuate sections which protrude from the longitudinal slot 122 and, seen from the slot, are of concave curved configuration. Provided between these two arcuate sections is a section with a more pronounced curvature which, seen from the slot, is of convex curved configuration. This convex section is supported at the bottom of the longitudinal slot 122. The other end section 123" which is likewise angled toward the slider 109 is guided for longitudinal displacement in the recess which accommodates it. Therefore, the protrusion of shaped spring 123 beyond the narrow longitudinal side 118 of slider 109 can adapt to the requirements, the frictional force being approximately identical throughout the entire temperature range on account of the large extent of deflection of the shaped spring. However, the frictional force is set at a somewhat higher value than in the first embodiment, which enables detention of slider 109 in its two end positions to be dispensed with.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A sun visor for motor vehicles comprising:
   a mirror;
   a plastic slider adapted for displacement for covering and uncovering said mirror, said slider having two edge zones extending in the direction of displacement;
   a plastic holder for said mirror and slider, said holder having a guide rail receiving one of each of said edge zones of said slider; and
   means provided on said slider at an edge zone of the slider for frictional engagement with said holder whereby said slider is retained on said holder.

2. The sun visor for motor vehicles of claim 1, wherein there is formed at least one of said two edge zones of said slider at least one elastic tongue which rests in a biased state against the guide rail accommodating this edge zone and which forms an elastic detent projection which at least in the one end position of said slider cooperates in a frictionally engaged manner with a detent provided on said guide rail.

3. The sun visor of claim 2, wherein said elastic tongue extends in the direction of displacement of said slider and has a detent projection on that side which comes to rest against said guide rail.

4. The sun visor of claim 3, wherein said elastic tongue is separated from the adjacent material part of said slider by a slot extending at least substantially in the direction of displacement, and the width of this slot at the level of the end section of said elastic tongue resting against said guide rail is approximately equal to a deflection of said elastic tongue by a material part of said detent projecting towards said slider.

5. The sun visor of claim 4, wherein said elastic tongue and said detent are associated with that end position of said slider in which said mirror is covered.

6. The sun visor of claim 5 wherein said edge zone having said elastic tongue at its one end is provided at its other end with a second elastic tongue formed thereon, said second elastic tongue extending in the direction of displacement of said slider towards the slider end adjacent to it and cooperating in that end position of said slider in which said mirror is uncovered by said slider, in a frictionally engaged manner with a second detent provided on said guide rail accommodating said second tongue.

7. The sun visor of claim 3, wherein said elastic tongue and said detent are associated with that end position of said slider in which said mirror is covered.

8. The sun visor of claim 2, wherein said elastic tongue and said detent are associated with that end position of said slider in which said mirror is covered.

9. The sun visor of claim 2, wherein said edge zone having said elastic tongue at its one end is provided at its other end with a second elastic tongue formed thereon, said second elastic tongue extending in the direction of displacement of said slider towards the slider end adjacent to it and cooperating in that end position of said slider in which said mirror is uncovered by said slider, in a frictionally engaged manner with a second detent provided on said guide rail accommodating said second tongue.

10. A sun visor of claim 9, wherein the side of said second elastic tongue which can be made to rest against said second detent is not in contact with the sliding surface formed by said edge zone when said tongue is in its relaxed state.

11. The sun visor of claim 10, wherein said slider has in its other edge zone at least one slot extending in the direction of displacement, and in that the narrow material part which delimits said slot outwardly and yields elastically towards said slider protrudes beyond the edge surface resulting from the thickness of said other edge zone.

12. The sun visor of claim 11, wherein both guide rails have a profile of U-type cross-section, with their one leg forming a bearing surface for said slider and their other leg forming a bearing surface for said mirror which, in turn, forms a bearing surface for said slider.

13. A sun visor of claim 12, wherein said slider has on the side facing said mirror one strip-like elevation along each of its two edge zones engaging said guide rails, said mirror resting against said strip-like elevations.

14. The sun visor of claim 9, wherein both guide rails have a profile of U-type cross-section, with their one leg forming a bearing surface for said slider and their other leg forming a bearing surface for said mirror which, in turn, forms a bearing surface for said slider.

15. The sun visor of claim 2, wherein both guide rails have a profile of U-type cross-section, with their one leg forming a bearing surface for said slider and their other leg forming a bearing surface for said mirror which, in turn, forms a bearing surface for said slider.

16. A sun visor of claim 15, wherein said slider has on the side facing said mirror one strip-like elevation along each of its two edge zones engaging said guide rails, said mirror resting against said strip-like elevations.

17. The sun visor of claim 2, wherein said slider has in its other edge zone at least one slot extending in the direction of displacement, and in that the narrow material part which delimits said slot outwardly and yields elastically towards said slider protrudes beyond the edge surface resulting from the thickness of said other edge zone.

18. The sun visor for motor vehicles of claim 1, wherein said edge zones have a thickness, and in the edge surface resulting from the thickness of said slider of at least one of its two edge zones extending in the direction of displacement, said slider has a longitudinal slot in which sections of a shaped spring are arranged, said shaped spring having a relaxed state and a length, said shaped spring protruding in the relaxed state at least throughout part of its length in the surface defined by said slider beyond said edge surface.

19. The sun visor of claim 18, wherein said shaped spring comprises a steel wire which is supported halfway along its length and at both ends at the bottom of said longitudinal slot.

20. The sun visor of claim 19, wherein the two ends of said shaped spring are angled and each engage one recess at the bottom of said longitudinal slot.

21. The sun visor of claim 20, wherein both guide rails have a profile of U-type cross-section, with their one leg forming a bearing surface for said slider and their other leg forming a bearing surface for said mirror which, in turn, forms a bearing surface for said slider.

22. A sun visor of claim 20, wherein said slider has on the side facing said mirror one strip-like elevation along each of its two edge zones engaging said guide rails, said mirror resting against said strip-like elevations.

23. A sun visor of claim 19, wherein said slider has on the side facing said mirror one strip-like elevation along each of its two edge zones engaging said guide rails, said mirror resting against said strip-like elevations.

24. The sun visor of claim 19, wherein both guide rails have a profile of U-type cross-section, with their one leg forming a bearing surface for said slider and their other leg forming a bearing surface for said mirror which, in turn, forms a bearing surface for said slider.

* * * * *